April 20, 1965  F. G. BLOCK  3,179,822
THERMIONIC ENERGY CONVERTERS
Filed Dec. 30, 1960
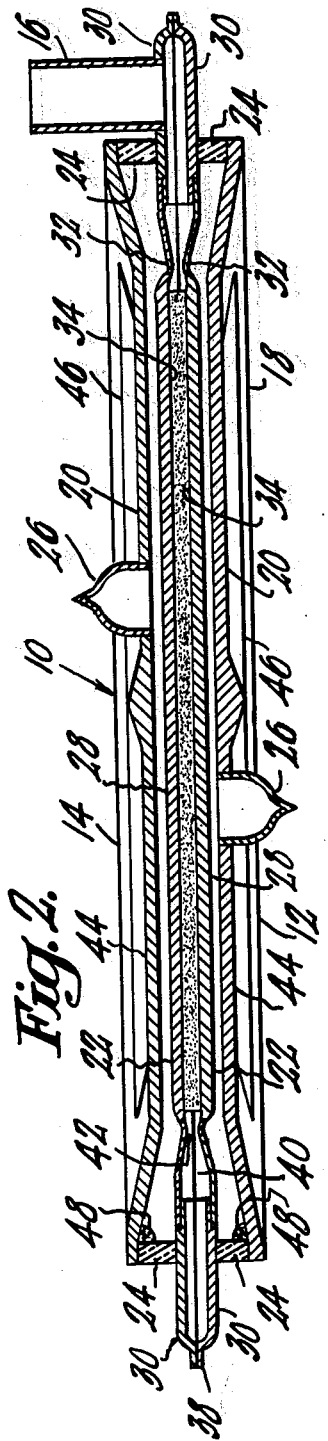
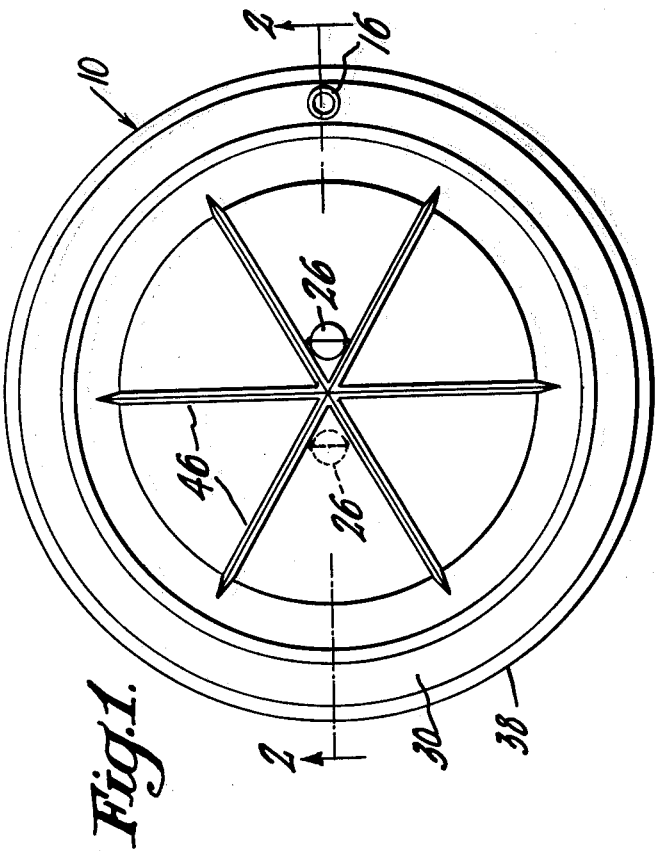
INVENTOR.
Fred G. Block
BY Thomas R. Webb
AGENT 3,179,822
THERMIONIC ENERGY CONVERTERS
Fred G. Block, Lancaster, Pa., assignor to Radio Corporation of America, a corporation of Delaware
Filed Dec. 30, 1960, Ser. No. 79,846
6 Claims. (Cl. 310—4)

The present invention relates to an improved thermionic energy converters, and particularly to such converters incorporating a built-in nuclear heat source.

A thermionic energy converter is an electron tube for converting heat energy from an external heat source to electrical energy. Such a tube comprises an evacuated or gas-filled envelope containing at least an electron emitting surface and an electron collecting surface spaced from each other to permit an electron space discharge therebetween. The emitting and collecting surfaces may be the inner surfaces of a cathode and a collector forming portions of the tube envelope to facilitate heating the cathode from an external source and cooling the collector. In one form of converter, known as the vacuum diode type, the envelope is highly evacuated and the two electrodes are mounted very close to each other, with a spacing of the order of a few tenths of a mil, to minimize space charge effects. In the vapor diode type, the two electrodes are not necessarily close spaced and the envelope is filled with a low partial pressure of an ionizable alkali metal vapor, such as cesium, to supply positive ions in the discharge space for neutralizing the space charge of the electrons and thereby producing maximum output current and voltage. In this type, the cathode surface should have an electron work function higher than the ionization potential of the vapor in order that the vapor atoms will be efficiently ionized at the surface of the electron emitter by the phenomenon of contact or surface ionization. In an improved converter, suitable for use with relatively low temperature heat sources, the electron emitter has a relatively low work function and the positive ions are produced by a third electrode in the discharge space, either by contact ionization of a vapor filling or by direct emission of positive ions into the discharge space. In another type of converter, the envelope has a filling of a noble gas, such as helium or argon, and an initial voltage is applied to the anode and collector to initiate a "ball-of-fire" mode of discharge, as described in a paper entitled "Studies of Externally Heated Hot Cathode Arcs," by L. Malter, E. O. Johnson and W. M. Webster, RCA Review, September 1951, pp. 415–35, to produce the positive ions for space charge neutralization of the electrons. In each kind of converter, the work function of the collector surface must be lower than the work function of the electron emitter, the output voltage being approximately equal to the difference between these work functions.

The combination of a nuclear reactor heat source and thermionic direct conversion of heat to electricity offers many new possibilities of application as well as improved performance in standard applications. Greatly improved performance can be obtained in mobile applications with the replacement of complex mechanical equipment by simple thermionic devices for generating electricity, combined with the long operating life possible with a nuclear reactor. Significant cost reductions should be possible in large central station power plants, since the higher potential cycle efficiencies possible with combined direct conversion and steam-electric production would reduce both fuel costs and the high capital costs per installed kilowatt for nuclear systems.

The design of thermionic energy converters for nuclear power plants must meet a number of specific requirements, among which are:

(1) Protection of the fuel and the hot parts of the converter (cathode, etc.) from the atmosphere;
(2) Attainment of criticality;
(3) Minimization of the quantity of materials poisonous to the reactor;
(4) Elimination of materials subject to radiation damage; and probably
(5) Removal of fission products.

Moreover, due to the nature of the fission reaction, it is highly desirable to be able to test each converter tube after manufacture by means other than the nuclear reactor itself.

Removal of the fission product gases from the converter is desirable for any device in which the cathode heat is produced directly from fission. A large fraction (approximately 30%) of the fission products are stable xenon and krypton, and these cause internal pressure buildup or swelling in fuel elements for reasonable irradiations. In thermionic converter units this problem is worse than in other atomic reactor devices since the cathode temperature is appreciably higher in converter units, causing both an increase in the presence of the noble gases and also an increase in the yield of volatile fission products.

For a small power package, of the order of 1 to 10 kw., the thermionic energy converter tubes may have externally exposed cathodes and be placed on the outside surface of the reactor. This implies that the problems of the converters and of the reactor can be handled separately, and that the combination only requires satisfactory heat transfer from the reactor to the converter cathodes.

For a power plant the situation is quite different, requiring an integration of the converters with the fuel elements of the reactor. It has been suggested that the nuclear fuel be encapsulated in a hollow cathode, which in turn is supported within a metallic vacuum envelope which serves as the collector of the converter tube. This arrangement has the advantage that the hot cathode is not exposed to the external atmosphere. On the other hand, such a converter tube can only be tested when exposed to the neutron flux in the reactor. Moreover, fission products are mixed with the cesium vapor in the tube and cannot be removed without disturbing the vapor.

The object of the present invention is to provide a new and improved thermionic energy converter.

Another object is to provide a novel twin combination of thermionic energy converter tubes.

A further object is to provide an improved thermionic energy converter unit having a built-in nuclear heat source.

Another object is to provide means in a nuclear fuel energy converter for removing the fission products without disturbing the vapor filling.

These and other objects are achieved in accordance with the present invention by providing two similar thermionic converter tubes, each having a depression on one side formed in part by an envelope portion which serves also as the cathode of the tube, at least one of the tubes being provided with an exhaust opening in the wall of the depression, arranging the two tubes with their depressions togther to form a chamber containing a body of nuclear fuel, and sealing the two tubes together around the periphery of the depression. The thermionic energy converter tubes may be of any known vacuum, vapor or gas type, as described above. The two converter tubes constitutes a converter tube unit comprising the two collectors on opposite sides and an intermediate common cathode-fuel structure having a peripheral cathode terminal. A multiplicity of such converter units may be combined together side-by-side in a layer which in turn is stacked in spaced parallel relation with a sufficient number of similar layers to attain criticality of the nuclear fuel. The fission reaction may be controlled by means of suitable control rods insertable between the layers, or between the converter units in each layer, in the manner usual in nuclear reactors. The external collectors of the converters may be cooled by high purity water which may also serve as moderator in the reactor. The use of high purity water as a moderator and coolant is described in the Proceedings of the International Conference on the Peaceful Use of Atomic Energy, vol. 3, pp. 211–220.

In the accompanying drawing:

FIG. 1 is a top plan view of a thermionic energy converter tube unit incorporating the present invention; and FIG. 2 is an enlarged transverse section view taken on the line 2—2 of FIG. 1.

FIGS. 1 and 2 illustrate the present invention embodied in a converter unit 10 made up of two similar disc-like thermionic energy converter tubes 12 and 14 of the vapor diode type, for example. The two tubes 12 and 14 are identical except for the fact that tube 14 has an exhaust tubulation 16 for removing fission products from the unit. Each converter tube comprises a vacuum-tight envelope 18 made up of a metallic collector 20, a metallic cathode and terminal structure 22, and an insulating ring 24 interposed between and sealed to the peripheral edges of the collector 20 and the structure 22. Each tube is provided with an exhaust tubulation 26 in the collector 20, with the tubulations located eccentrically to facilitate stacking of adjacent converter units in layers.

Each cathode and terminal structure 22 comprises a central cathode disc 28 joined at its outer periphery to an annular terminal member 30. Each cathode disc 28 has an outwardly extending annular rib 32 which forms a shallow depression 34 which mates with the corresponding depression 34 in the cathode disc 28 of the other tube in the unit to form a chamber for the reactor fuel which fuel may be in the form of a disc 37 of fissionable material. Each terminal member 30 also has a peripheral flange 38 which is sealed to the corresponding flange 38 of the other tube to form an annular chamber 40 closed at the outer periphery and communicating with the fuel chamber 36 through a restricted annular gap 42 between the adjacent ribs 32. The exhaust tubulation 16 opens into the chamber 40.

Each collector 20 is shown as comprising a central disc portion and an integral beveled peripheral portion forming an external depression 44, and an array of integral stiffening ribs 46.

A small amount of metallic cesium 48 is enclosed within each tube envelope 18 for supplying the cesium vapor used to provide positive ions for space charge neutralization.

For the vapor diode type illustrated, the cathode disc 28 may be of pure tungsten, molybdenum or tantalum, thoriated-tungsten, zirconium carbide, or tungsten doped with lanthanum oxide or lanthanum carbide, for example, each of which has surface areas having a work function higher than the ionization potential of the vapor used. The collector disc 20 may be of zirconium, nickel, copper, molybdenum, or other suitable metals or their alloys. The insulators 24 are preferably of high alumina ceramics, or other ceramics such as Forsterite. The nuclear fuel may be fissionable uranium oxide ($UO_2$), uranium carbide (UC), or similar materials. Each of the terminal members may comprise an outer ring of molybdenum or tantalum and a thin inner ring of tantalum or rhenium, for example. The exhaust tubulation may be of nickel, copper or tantalum, for example. Instead of cesium, one of the other alkali metals, rubidium and potassium, may be used. However, cesium is the preferred positive ion source.

There are two different kinds of cesium diode converters. In the low pressure type, the cesium pressure is $10^{-2}$ to $10^{-3}$ mm. of mercury, the tungsten or other cathode material is substantially bare, and hence, must be heated to a temperature of at least 2000° C. for electron emission, and the electrode spacing may be of the order of 40 mils. In the high pressure type, the cesium pressure is of the order of 1 mm. of mercury, the cathode is cesiated and operates at 1300° C. and up, and the electrode spacing should be of the order of 1 to 5 mils to obtain a low internal impedance for high output voltage and efficiency.

In the operation of each tube, the cathode 28 is heated and maintained at a temperature in the range from 1300° C. to 2200° C. depending upon the cesium vapor pressure. The collector 20 is heated from the cathode by radiation as well as by electron bombardment. The collector 20 is cooled, as by means of circulation of insulating distilled water over the tubes in the stack, to keep its temperature substantially below that of the cathode. Heating of the cathode also vaporizes the metallic cesium to provide the desired cesium vapor within the tube. Some of the cesium is deposited on the collector thereby reducing the work function of the collecting surface. In the high pressure type, cesium is also deposited on the hot cathode, thereby lowering its work function and operating temperature. Vapor atoms coming into contact with the bare areas of the hot cathode give up electrons thereto by contact ionization and become positive ions. The electron emissive areas of the cathode emit electrons in the general direction of the collector. Part of the electrons have sufficient residual kinetic energy to reach the collector and be collected. Each electron collected gives up energy to the collector, in the form of heat, corresponding to the work function of the collector. If the collector is connected to the cathode through a low impedance load, the electrons passing through the load generate a voltage therein equal to the difference in work function of the cathode and collector. Since the collector is cooler than the cathode the fractional coverage of the collector is greater than that of the cathode, which results in a lower work function of the collector even if the materials are the same. The positive cesium ions neutralize the space charge of the electrons, permitting very large electron currents.

The present invention provides a sandwich design in which each half of the sandwich is a complete converter tube without the nuclear fuel. The exposed cathode permits each tube to be completely tested prior to being assembled with the nuclear fuel and the other tube of the unit, by heating the exposed surface of the cathode disc 28 with any suitable external heat source.

After the individual tubes have been tested, they are assembled in pairs, as shown in the drawing, with a disc of nuclear fuel within the chamber 36, and joined together by welding the registering edges of terminal members 30. This joint is made vacuum-tight to maintain a low pressure within the chambers 36 and 40 during pumping.

The converter units 10 may be assembled together in any desired manner, with the exhaust tubulations 16 connected to one or more exhaust pumps for continuously removing the fission products from the converter units during operation. The pressure in the fuel chambers 36 may be from $10^{-2}$ to $10^{-6}$ mm. of mercury.

Instead of fissionable nuclear fuel, other nuclear fuels may be used, such as the active radioisotopes polonium 210 and various compounds of curium 242.

What is claimed is:

1. A thermionic energy converter comprising a sealed envelope containing a collector and a disc cathode spaced from said collector and forming part of said envelope, external means for heating said cathode comprising a wall sealed to the peripheral edge of said cathode to form a sealed fuel chamber and a supply of nuclear fuel disposed within said chamber, and means communicating with said chamber for removing nuclear reaction products therefrom during operation of said converter.

2. A thermionic energy converter as in claim 1, wherein said nuclear fuel is a fissionable material.

3. A thermionic energy converter as in claim 1, wherein said envelope contains a source of positive ions for neutralizing the space charge of the electrons emitted by said cathode.

4. A thermionic energy converter unit comprising a pair of similar converter tubes each having a cathode forming part of the envelope of the tube, said tubes being joined together with their cathodes spaced apart to form a fuel chamber therebetween, a supply of nuclear fuel disposed within said chamber, and means communicating with said chamber for removing nuclear reaction products therefrom during operation of said converter unit.

5. A thermionic energy converter unit as in claim 4, wherein each of said tubes includes a collector spaced from said cathode and forming part of the tube envelope.

6. A thermionic energy converter tube comprising a cathode and a collector sealed together in spaced relation by means including a ceramic insulating ring to form a vacuum-tight envelope, said cathode forming part of said envelope and comprising a flat metal disc having an outwardly extending peripheral edge portion, external means for heating said cathode comprising a second flat metal disc having an outwardly extending peripheral edge portion sealed to said first-named edge portion to form a sealed fuel chamber between said discs and a supply of nuclear fuel disposed within said chamber, and means communicating with said chamber for removing nuclear reaction products therefrom during operation of said converter.

References Cited by the Examiner

UNITED STATES PATENTS

| 1,904,436 | 4/33 | Franklin | 313—246 |
| 2,873,853 | 2/59 | Burton. | |
| 3,002,116 | 9/61 | Fisher | 310—4 |
| 3,054,914 | 9/62 | Hatsopoulis | 310—4 |

OTHER REFERENCES

RCA Review, pages 244–258, June 1958.

MILTON O. HIRSHFIELD, *Primary Examiner.*

DAVID X. SLINEY, *Examiner.*